United States Patent [19]
Ohzono et al.

[11] Patent Number: 5,649,768
[45] Date of Patent: Jul. 22, 1997

[54] COMPOUND ROLLING GUIDE UNIT

[75] Inventors: Gen Ohzono, Aichi-ken; Norimasa Agari, Seki; Hiroshi Ueki, Ebina, all of Japan

[73] Assignee: Nippon Thompson Co., Ltd., Tokyo, Japan

[21] Appl. No.: 614,008

[22] Filed: Mar. 12, 1996

[30] Foreign Application Priority Data

Mar. 24, 1995 [JP] Japan ................................ 7-089995

[51] Int. Cl.$^6$ ................................................ F16C 29/06
[52] U.S. Cl. ................................................ 384/43; 384/45
[58] Field of Search ................................ 384/43, 44, 45

[56] References Cited

U.S. PATENT DOCUMENTS

| | | | |
|---|---|---|---|
| 2,945,366 | 7/1960 | Sears | 384/43 X |
| 3,353,875 | 11/1967 | Karge | 384/45 |
| 4,515,415 | 5/1985 | Szenger | 384/45 X |
| 4,941,197 | 7/1990 | Roeser | 384/44 |
| 5,242,227 | 9/1993 | Komiya et al. | 384/45 |

FOREIGN PATENT DOCUMENTS

| | | | |
|---|---|---|---|
| 1026874 | 5/1953 | France | 384/45 |
| 53214 | 3/1985 | Japan | 384/43 |
| 2-43520 | 3/1990 | Japan . | |
| 2-40124 | 3/1990 | Japan . | |
| 5-172138 | 7/1993 | Japan . | |
| 285556 | 1/1953 | Switzerland | 384/43 |

Primary Examiner—Thomas R. Hannon
Attorney, Agent, or Firm—Browdy and Neimark

[57] ABSTRACT

A compound rolling guide unit in which a plurality of sliders are saddled on a track rail, in each of longitudinal surfaces of which raceway grooves are formed, in such a manner that the sliders can be slid relatively to the track rail, is provided with raceway grooves in each longitudinal surface of the track rail, a plurality of sliders being saddled on each surface of the single track rail so that the sliders are slid relatively to the track rail. The sliders can be slid independently of each other in the longitudinal direction of and relatively to the track rail.

13 Claims, 8 Drawing Sheets

5,649,768

COMPOUND ROLLING GUIDE UNIT

BACKGROUND OF THE INVENTION

1. Field of the Invention

This invention relates to a compound rolling guide unit incorporated in a semiconductor manufacturing apparatus, a transfer apparatus, an industrial robot and an assembly robot, and having a slider saddled on and slidable relatively to a track rail.

2. Description of the Prior Art

In recent years, the mechatronics techniques have been developed remarkably, and the improvement of the accuracy and operational speed and a decrease in the dimensions of a rolling guide unit have been demanded. The use of a rolling guide unit is being widened at present in accordance with the development of the techniques. For example, the expansion of the use of a rolling guide unit-incorporated assembly robot has been demanded, and assembly robots ranging in size from a large-scale to a small-scale have been manufactured. The rolling guide units incorporated in these assembly robots have been demanded to have an adaptability to the improvement of the accuracy and operational speed and a decrease in the dimensions of the assembly robots.

There is a known linear motion rolling guide unit shown in FIGS. 16 and 17. In this linear motion rolling guide unit, a slider 1 is set in a saddled state on a track rail 2 and moved slidingly via rolling elements 7 rolling circulatingly along raceway grooves 4 in the track rail 2. The track rail 2 is provided with the raceway grooves 4 in both of longitudinally extending side surfaces 3 thereof. The track rail 2 is also provided with a plurality of mutually spaced fixing holes 13 opened in its longitudinally extending upper surface 14. The track rail 2 is fixed on a mount base 20, such as a bed, a machine base and a machining base. Bolts are inserted into the fixing holes 13 made in the track rail 2, and then screwed into threaded holes made in the mount base 20, whereby the track rail 2 is fixed on the mount base 20. The slider 1 has a casing 5 capable of being moved relatively to the track rail 2, and end caps 6 attached to both ends of the casing 5. The casing 5 is provided in its upper portion with fixing holes 19 for use in fixing thereto another machine, a machine part, a chuck and a clamp. The casing 5 and end caps 6 are provided in their lower surfaces with recesses 10 so that the casing 5 and end caps 6 are moved astride the track rail 2, and the portions of the recesses 10 which are opposed to the raceway grooves 4 in the track rail 2 are provided with raceway grooves 9. The rolling elements 7 comprising balls or rollers are inserted in raceways formed by the opposed raceway grooves 4, 9 so that the rolling elements 7 are rolled therein. In order to prevent the rolling elements 7 from falling from the casing 5, retainer bands 18 are fixed to the casing 5 so as to enclose the rolling elements 7. In order to attain the sealing of clearances between the track rail 2 and slider 1, lower seals 8 are provided on a lower surface of the slider 1.

The end caps 6 are provided at both side portions thereof with claws 22, by which the rolling elements 7 are scooped from the raceway grooves 4 constituting loaded raceways with respect to the track rail 2, and direction changing passages 11 used to change the rolling direction of the rolling elements 7 for circulating the same. Side seals 17 for attaining the sealing of the clearances between the track rail 2 and both of longitudinal end portions of the slider 1 are fixed to the end caps 6. The end caps 6 are fixed to both end surfaces of the casing 5 by screws 25 driven through a plurality of fixing holes 24. The rolling elements 7 in a load region which roll in the raceway grooves 4 in the track rail 2 are introduced into the direction changing passages 11 formed in the end caps 6, and they are then moved to return passages 12 formed in upper portions of the casing 5 so as to extend in parallel with the raceway grooves 9, the rolling elements 7 being thus rolled in endless circulating passages. Owing to the rolling of the loaded rolling elements 7 rolling in the raceways formed between the raceway grooves 9, 4 provided in the slider 1 and track rail 2 respectively, the track rail 2 and slider 1 can be moved smoothly with respect to each other.

There is a conventional rolling unit provided with raceway grooves in the upper and lower portions of side surfaces of a track rail, and disclosed in, for example, Japanese Patent Laid-Open No. 172138/1993. The linear slide shaft unit disclosed in this publication provides a linear slide shaft capable of being moved forward and backward accurately with respect to a fixed portion such as a housing, and capable of being thus guided without causing deformation to occur therein even when the slide shaft is formed tubularly. The slide shaft is formed to a square cross sectional shape and provided with ball rolling grooves in the upper and lower portions of a pair of opposite side surfaces thereof. The upper slider and lower slider saddle in the upper and lower surfaces of the slide shaft and move back and forth.

Japanese Utility Model Laid-Open No. 43520/1990 or Japanese Utility Model Laid-Open No. 40124/1990 discloses a double linear guide unit. In the double linear guide unit disclosed in this Japanese Utility Model Laid-Open No. 43520/1990, a guide rail is provided with axially extending rolling grooves doubly in both side surfaces thereof so that a plurality of sliders can be fitted loosely in the guide rail and move past the other slider.

It has been demanded so as to keep pace with the development of the techniques in recent years that a linear motion guide unit be provided with multiple functions and has a compact structure. In order to form a conventional linear motion rolling guide unit to a four-directional structure, it is necessary to set linear motion rolling guide units on four sides of a core member, and carry out such guide unit assembling operations with a high accuracy in each of the four guide unit setting directions, so that the resultant assembly lacks compactness. A linear motion rolling guide unit formed by fitting sliders in the upper and lower portions of a track rail as mentioned previously is also compact as compared with a linear motion rolling guide unit having a single slider. However, in the guide unit having two sliders, the sliders are provided on, for example, the upper and lower sides alone of a track rail by forming raceway grooves in only two surfaces out of four surfaces of the track rail. Moreover, the sliders are provided on only the upper and lower sides of a track rail, and the directivity of the guide unit is limited. Therefore, the range of application of this guide unit to an industrial robot and an assembly robot is limited, so that this guide unit is difficult to be used.

SUMMARY OF THE INVENTION

An object of the present invention is to solve these problems, and provide a compound rolling guide unit having a plurality of sliders on one track rail, which slides can be slid independently of each other on and relatively to the track rail; formed to a structure in which the directivity concerning the fixing of the sliders with the track rail is not limited; capable of reducing the number of parts; capable of combining the sliders with the track rail with a high accuracy by increasing the accuracy of each slider with respect to the single track rail; and capable of being applied to comparatively small-scale apparatus including an assembly robot, an industrial robot, a semiconductor manufacturing apparatus, and inspection apparatus and a machine tool.

The present invention relates to a compound rolling guide unit having a track rail provided with first raceway grooves in its longitudinally extending opposite surfaces, and a slider provided with second raceway grooves in the portions thereof which are opposed to the first raceway grooves, and saddled on and slid relatively to the track rail, the first raceway grooves formed in the surfaces of the track rail comprising a plurality of pairs of raceway grooves, the plurality of sliders being saddled on the single track rail via different pairs of first raceway grooves and capable of being slid independently of the other sliders and relatively to the track rail in the longitudinal direction thereof.

The track rail comprises a substantially cross-sectionally square body provided with four surfaces, in each of which one or a plurality of first raceway grooves are formed.

The track rail comprises a substantially cross-sectionally circular body, in which a pair or pairs of first raceway grooves are formed in a substantially diametrically opposed relation.

The track rail or one of the sliders is fixed on a mount base. In order to fix the track rail, an end potions or a desired portion of thereof may be fixed to the mount base. In a certain case, the track rail is fixed on a mount base rotatably via bearings. In this case, an end portion or a desired portion of the track rail may be rotatably supported.

The sliders moved slidingly on and relatively to the track rail may comprise, if desired, sliders of different sizes.

Each of the sliders has rolling elements rolling in the raceways formed between the first and second raceway grooves, a casing provided with a recess in which the second raceway grooves are formed, and end caps provided on both of the end surfaces of the casing.

Since this compound rolling guide unit is constructed as described above, the sliders can be slid independently of each other on and relatively to the track rail, and the directivity concerning the fixing of the sliders to the track rail is not limited. For example, when the track rail is formed to a substantially cross-sectionally square shape, the sliders can be provided in four directions. When the track rail is formed like a ball spline shaft, the sliders can be provided in any desired directions. This enables the range of application of the rolling guide unit to be expanded.

The raceway grooves in the track rail can be formed to various sizes, or a plurality of raceway grooves can be provided in one surface. Sliders of various sizes can be provided on a single track, and each slider can be moved relatively to the track rail and independently of the other sliders. A support member and a mechanical appliance and tools can be mounted on each slider. The support member and mechanical appliance can clamp a product to be transferred and a workpiece in cooperation with each other, and carry out the transferring and positioning of articles with a high accuracy and at a high speed. If this rolling guide unit is applied to, for example, an industrial robot, an assembling apparatus or a transfer apparatus, the requirements for heightening the working speed and accuracy thereof, reducing the dimensions and weight thereof and improving the responding characteristics thereof can be met. It has only to be done that the accuracy of assembling each slider with respect to the single track rail be improved, and an accumulated error between the sliders due to the assembling operations does not occur, so that complicated assembling regulating work becomes unnecessary. Therefore, this rolling guide unit can be formed to a firm structure having a very high stability with respect to the strength thereof, and meet the requirements for heightening the working accuracy and speed and reducing the dimensions and weight thereof.

In this compound rolling guide unit, it is possible to saddle a required number of sliders on each surface of a track rail and move the same slidingly and relatively to the track rail, form raceway grooves in each surface variously in number and size, fix different sizes of machines, machine parts, clamps, chucks or support members to the sliders in accordance with the fixing holes provided therein, determine the devices in accordance with an apparatus to which the guide unit is applied, and make a linear relative movement of each slider on the track rail very accurately and very stably. If this guide unit is incorporated in, for example, an industrial robot, a machine tool, an assembling apparatus or a transfer apparatus, highly accurate assembling work, highly accurate machining work and a highly accurate operation for setting a workpiece in a position to which it is to be transferred can be attained.

Accordingly, when this compound rolling guide unit is applied to an industrial robot, an assembly robot, an inspection apparatus or a semiconductor manufacturing apparatus, the various requirements for these apparatus to move in various directions, increase the operation speed, reduce the dimensions and improve the operation accuracy and responding characteristics can be satisfied.

DESCRIPTION OF THE PREFERRED EMBODIMENTS

Figure 16:
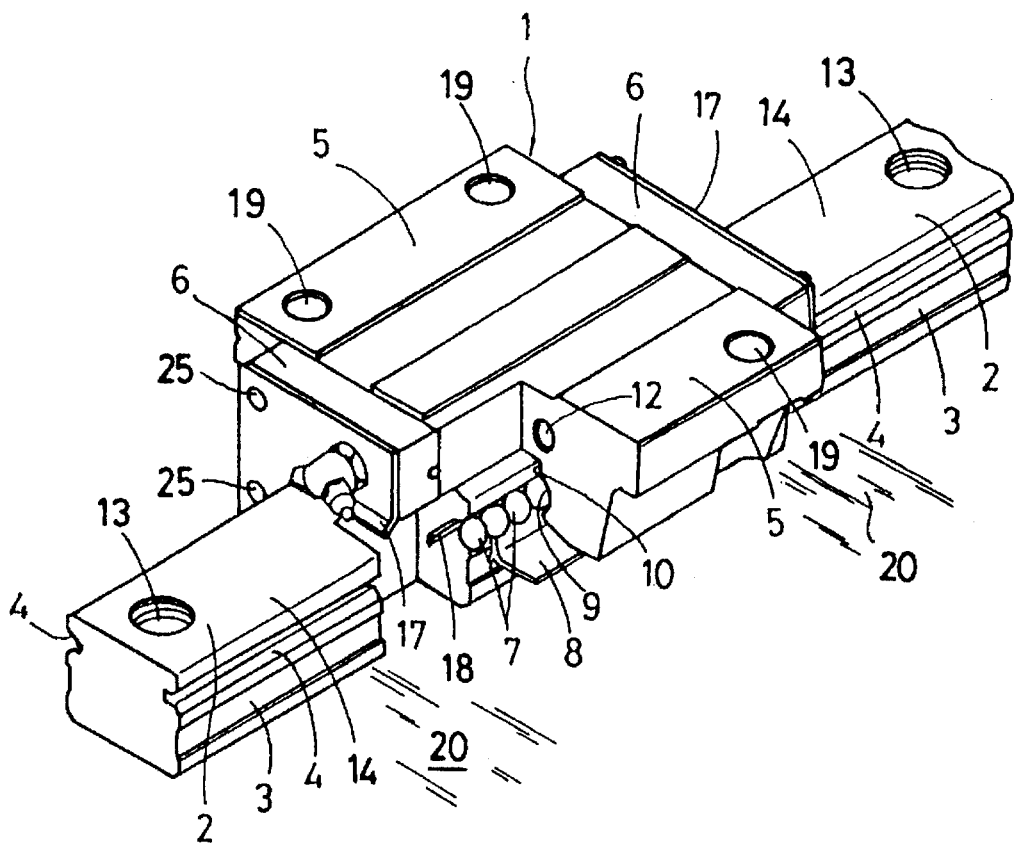
FIG. 16 is a perspective view showing a conventional linear motion rolling guide unit.
Figure 17:
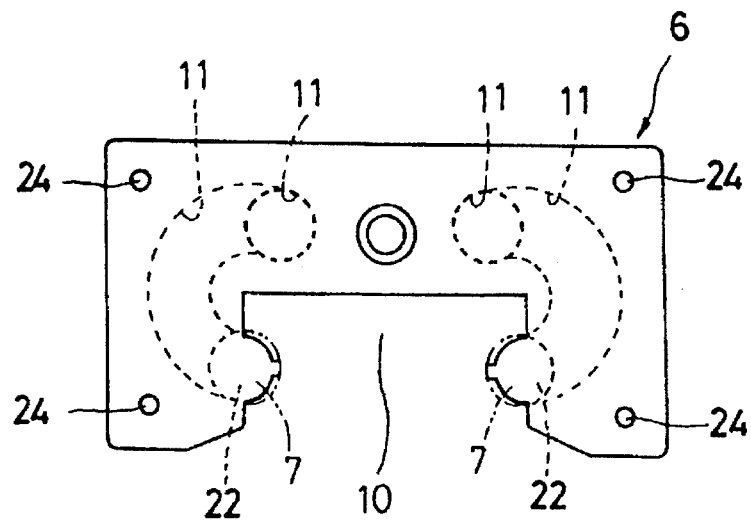
FIG. 17 is an end view of an end cap incorporated in the linear motion rolling guide unit of FIG. 16.

The embodiments of the compound rolling guide unit according to the present invention will now be described with reference to the drawings. The parts of the embodiments of this compound rolling guide unit which basically correspond to those of the conventional apparatus shown in FIGS. 16 and 17 are designated by the same reference numerals in the drawings with reference to which these embodiments will be described, whereby duplicated descriptions will be omitted. Although these embodiments to be described with reference to the drawings are directed to compound linear motion rolling guide units, they can also be applied to compound curved motion rolling guide units. According to the present invention, a track rail can be formed to a cross-sectionally square shape (track shaft) or to a cross-sectionally circular shape (ball spline shaft), and balls or rollers can be utilized as rolling elements.

Figure 1:
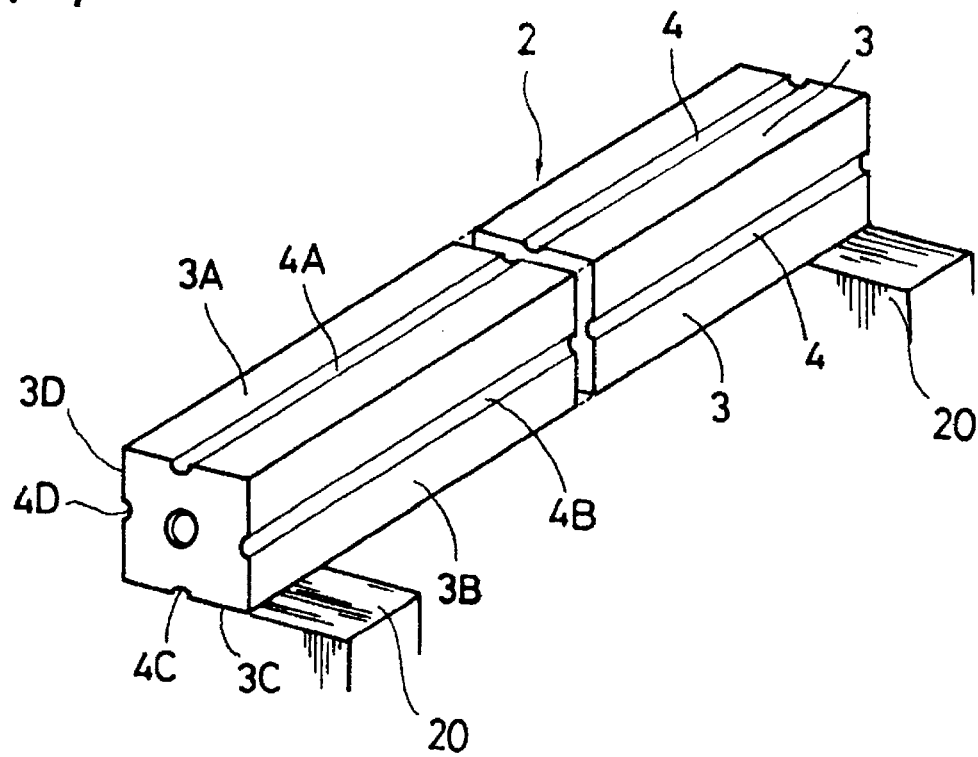
FIG. 1 is a perspective view showing a first example of the track rail in the compound rolling guide unit according to the present invention.
Figure 2:
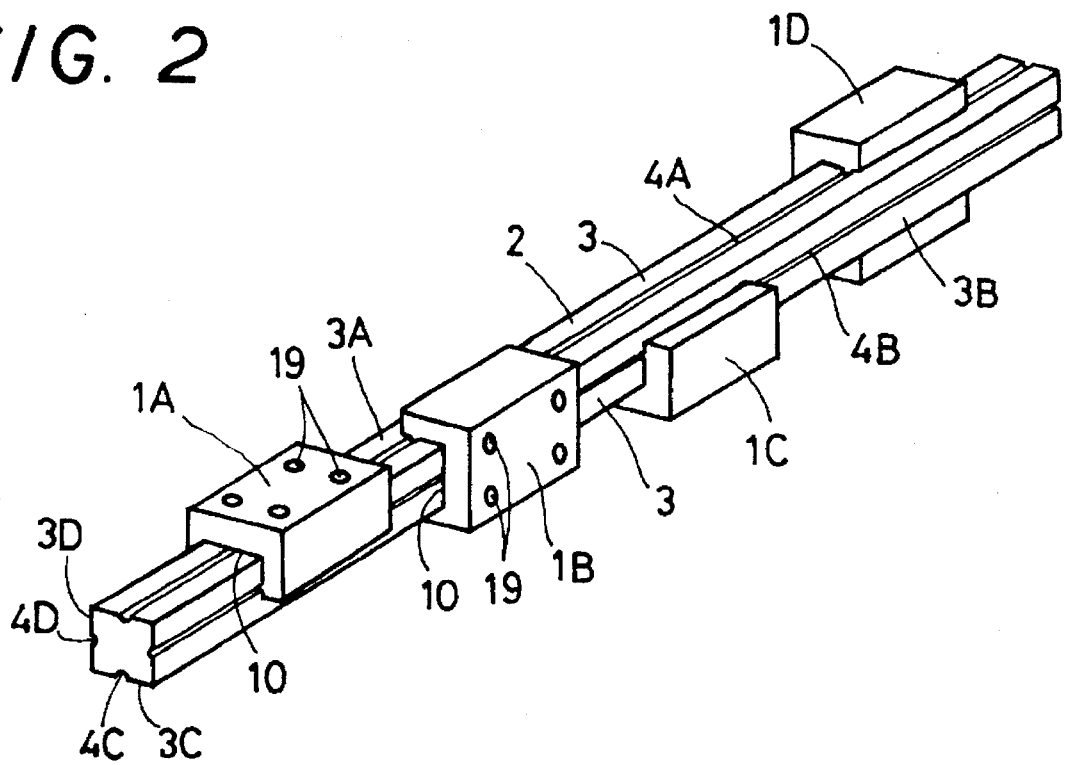
FIG. 2 is a perspective view explaining the compound rolling guide unit of FIG. 1.

A first embodiment of the present invention will now be described with reference to FIGS. 1 and 2. The first embodiment utilizes a linear motion rolling guide unit shown in FIG. 16, and is formed by at least one track rail 2 and a plurality of sliders 1A, 1B, 1C, 1D (which will hereinafter be shown by a reference numeral 1 when they are named generally), wherein sliders 1 saddled on a track rail 2, a part of which is fixed on a mount base 20, such as a base, a mounting plate and a mounting block, are moved in the longitudinal direction of and relatively to the track rail 2. In the first embodiment, a guide unit using a track rail 2 having a cross-sectionally quadrangular shape (regular square shape and a rectangular shape) with other machines and machine parts fixed to the sliders 1 via fixing holes 19 is described. Regarding the track rail, a ball spline shaft having a substantially circular cross-sectional shape can also be used instead of a track rail having a substantially square cross-sectional shape as will be described later.

This compound rolling guide unit has a track rail 2 provided with raceway grooves 4 in all of the longitudinally extending surfaces 3 thereof, sliders 1 saddled on and moved linearly along and relatively to the track rail 2 and provided with raceway grooves (not shown) in the portions of the opposite surfaces of recesses 10 which are opposed to the raceway grooves 4, and rolling elements rolling in raceways formed between the raceway grooves 4 in the track rail 2 and those in the sliders 1. The track rail 2 is formed to a substantially square cross-sectional shape so as to have four surfaces 3A, 3B, 3C, 3D (which will hereinafter be shown by a reference numeral 3 when they are named generally), and, in the embodiment, the surfaces 3A; 3B, 3D; 3C are called an upper surface, side surfaces and a lower surface respectively in some cases. The four surfaces 3A, 3B, 3C, 3D are provided with raceway grooves 4A, 4B, 4C, 4D (which will hereinafter be shown by a reference numeral 4 when they are named generally), i.e. two pairs of raceway grooves 4A, 4C; 4B, 4D. Each of the plurality of sliders 1 is saddled on one of the surfaces 3 of the track rail 2 so as to be slid relatively thereto. Therefore, the sliders 1 are formed so that they can be slid along the four surfaces 3, independently of one another and relatively to the track rail. Namely, the sliders 1A, 1B, 1C, 1D are saddled on the upper surface 3A, side surface 3B, lower surface 3C and side surface 3D respectively so that the sliders can be slid on the track rail 2 independently of one another and relatively to the track rail.

Each of the sliders 1 has, for example, a casing provided with a longitudinally extending recess 10 (FIG. 16), end caps provided on both end surfaces of the casing and having recesses 10 (FIG. 17), and side seals 17 (FIG. 16) provided on both end surfaces of the end surfaces of the end caps. Of course, when the sealing can be attained by the end caps, the side seals 17 may not be provided in some cases. The sliders 1 can be provided through the fixing holes 19 with fixing means for securing cutting tools, jigs and parts of transfer clamps and mechanical instruments thereto. The end caps are provided with direction changing passages 11 (FIG. 17) for use in changing the rolling direction of the rolling elements 7 (FIG. 16).

In this compound rolling guide unit, a required number of sliders 1 can be saddled on each surface 3 of the track rail 2 and slid relatively to the track rail 2. Moreover, the raceway groove in each surface can be formed to various sizes, and a slider of a certain size out of sliders of different sizes can be fitted therein accordingly. The sizes of the raceway grooves and sliders can be determined in accordance with that of an apparatus to which the guide unit is applied, and the linear relative movements of the sliders 1 with respect to the track rail 2 can be made very accurately and stably. For example, when this guide unit is incorporated in an industrial robot, a machine tool, an assembling apparatus and a transfer apparatus, a highly accurate assembling operation, a highly accurate machining operation and a highly accurate operation for setting a work in a position to which it is to be transferred.

Figure 3:
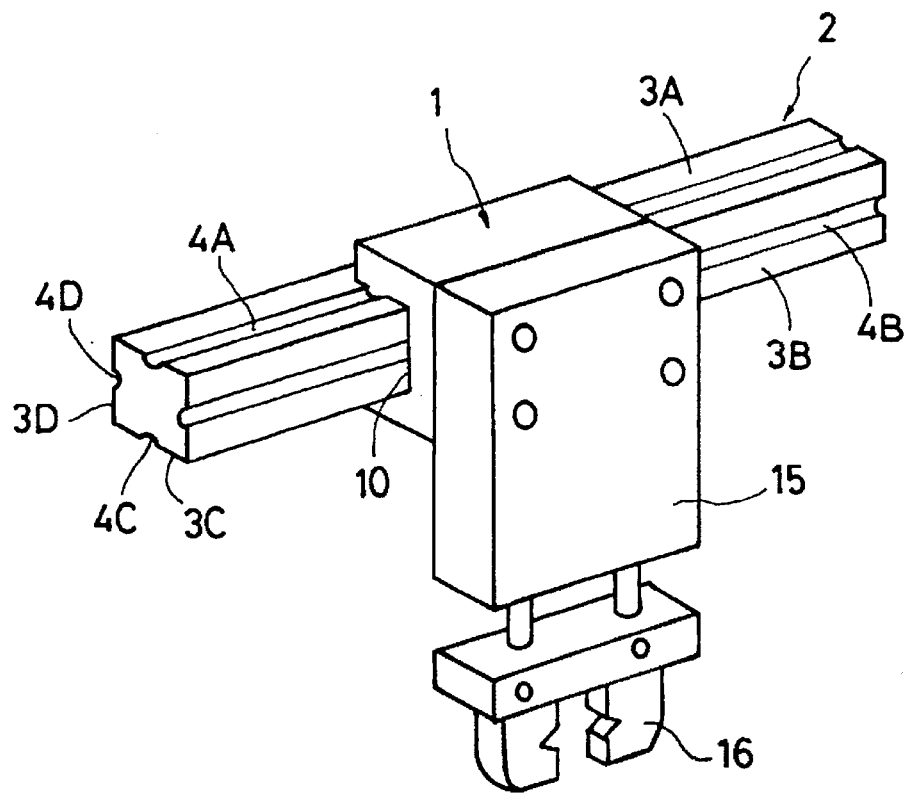
FIG. 3 is a perspective view showing a second embodiment of the present invention.

A second embodiment of the present invention will now be described with reference to FIG. 3. The second embodiment has the same construction and function as compared with the first embodiment except that a slider 1 is provided with a downwardly extending clamp means, so that duplicated descriptions will be omitted. In the second embodiment, the slider 1 is saddled at its recess 10 on a side surface 3B of a track rail 2, and raceway grooves 9 (FIG. 16) in a casing 5 (FIG. 16) of the slider 1 are opposed to those 4A, 4C formed in upper and lower surfaces 3A, 3C of the track rail 2. The slider 1 is combined with the track rail 2 so that it can be slid along and relatively to a side surface 3B extending in the longitudinal direction (direction of X-axis) of the track rail 2. The slider 1 is provided with a support member 15 extending downward (direction of Z-axis) and fixed thereto by utilizing fixing holes 19 (FIG. 16), and a clamp 16 for holding an object, such as a machine part or a work is fixed to a lower end portion of the support member 15.

Figure 4:
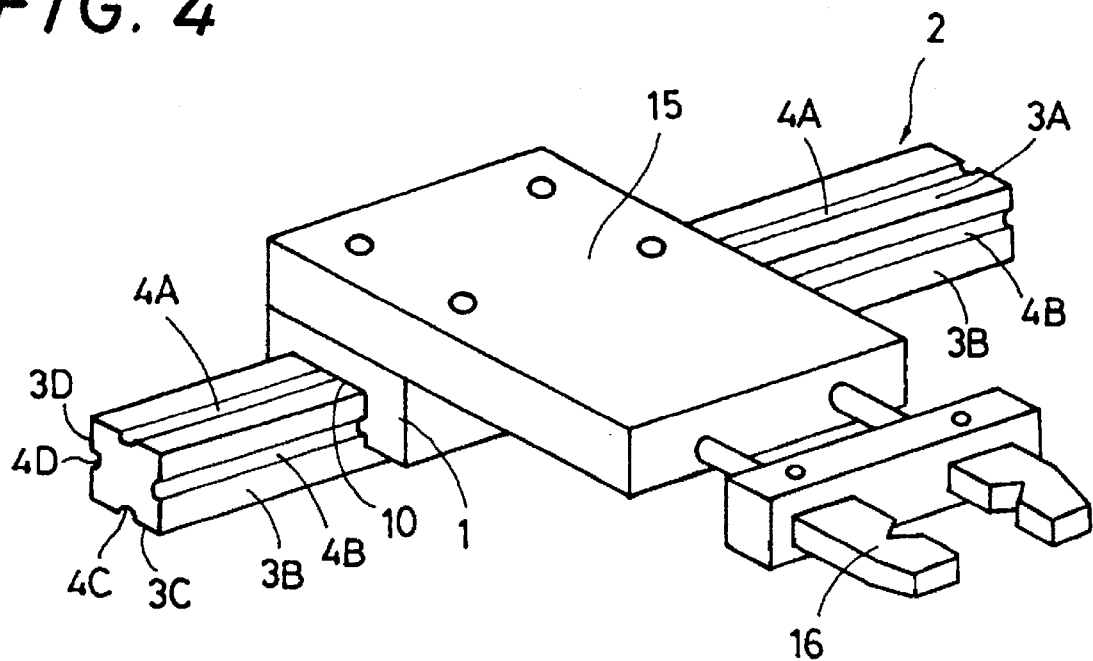
FIG. 4 is a perspective view showing a third embodiment of the present invention.

A third embodiment of the present invention will now be described with reference to FIG. 4. The third embodiment has the same construction and function as the second embodiment of FIG. 3 except that a slider 1 is saddled on an upper surface A of a track rail 2. In the third embodiment, the slider 1 is saddled at its recess 10 on the upper surface 3A of the track rail 2, and raceway grooves 9 (FIG. 16) in a casing 5 of the slider 1 are opposed to those 4B, 4D formed in side surfaces 3B, 3D of the track rail 2. The slider 1 is provided with a laterally extending support member 15 fixed thereto, and a clamp 16 for holding an object, such as a machine part or a work is fixed to a free end portion of the support member 15.

Figure 5:
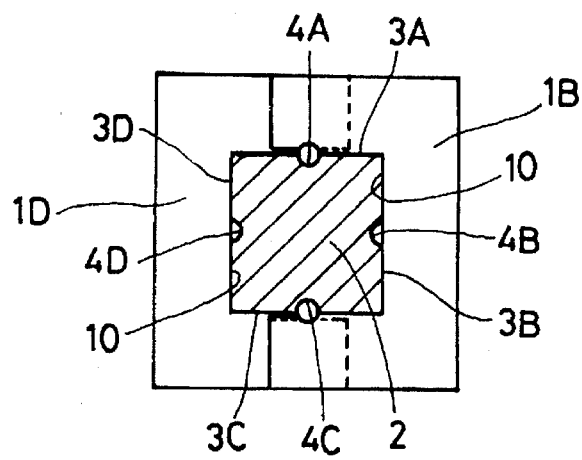
FIG. 5 is an end view showing a fourth embodiment of the present invention.

A fourth embodiment of the present invention will now be described with reference to FIG. 5. In the fourth embodiment, sliders 1 can be saddled on any of longitudinal surfaces of a track rail 2 as shown in FIG. 2. In FIG. 5, an example having sliders 1B, 1D saddled on both side surfaces 3B, 3D of the track rail 2 and adapted to be slid relatively thereto is shown. The condition in which the slider 1B is positioned on the front side of the track rail 2 with the slider 1D positioned on the rear side thereof is illustrated.

Figure 6:
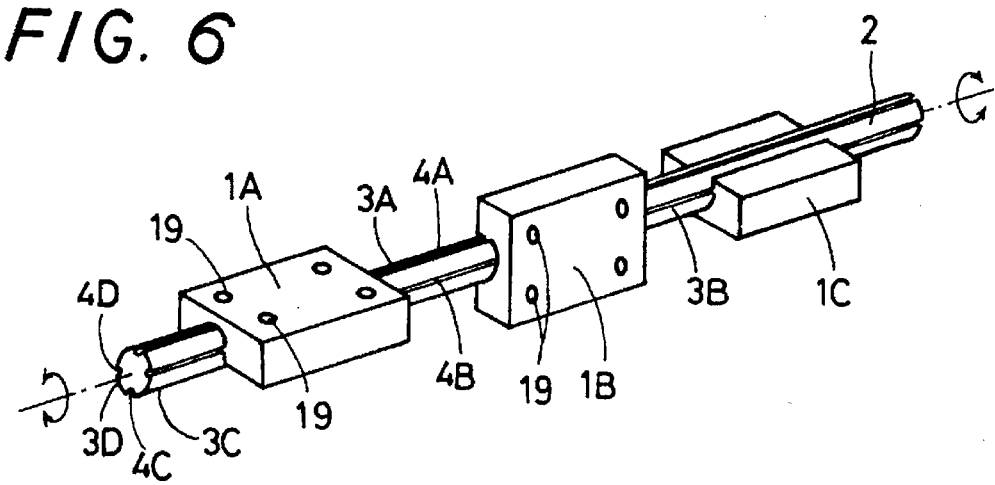
FIG. 6 is a perspective view showing a fifth embodiment of the present invention.

A fifth embodiment of the present invention will now be described with reference to FIG. 6. The fifth embodiment has the same construction as the first embodiment of FIG. 2 except that a track rail 2 the shape of which is different from that of the track rail in the first embodiment is provided rotatably. The track rail 2 comprises a cylindrical shaft, such as a ball spline shaft of a substantially circular cross-sectional shape. The raceway grooves 4 provided in this track rail 2 are paired in the substantially diametrical direction thereof, and the size, number and direction of the raceway grooves 4 can be set taking the sliders into consideration and in accordance with an apparatus to which the guide unit is applied. The track rail 2 in the fifth embodiment is provided with a raceway groove 4A positioned in an upper surface 3A, raceway grooves 4B, 4D positioned in both side surfaces 3B, 3D, and a raceway groove 4C positioned in a lower surface 3C. The sliders 1 include a slider 1A saddled on the upper surface 3A of the track rail 2, a slider 1B saddled on the side surface 3B thereof, and a slider 1C saddled on the lower surface 3C thereof.

Figure 7:
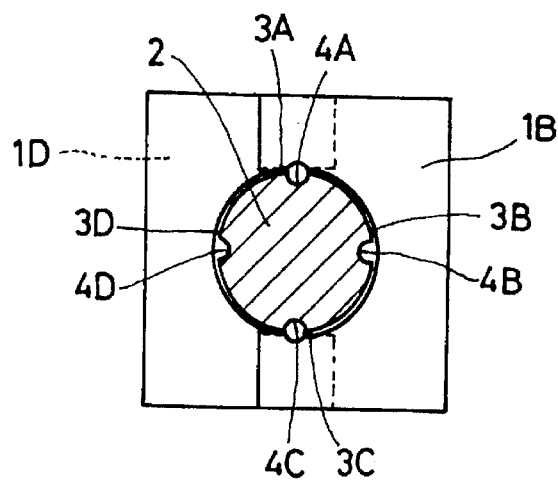
FIG. 7 is an end view showing a sixth embodiment of the present invention.

A sixth embodiment of the present invention will now be described with reference to FIG. 7. The sixth embodiment, in which sliders 1 can be mounted on any portions of a track rail 2, has sliders 1B, 1D saddled on both side surfaces 3B, 3d thereof. The sliders 1B, 1D are saddled on both side surfaces 3B, 3D of the track rail 2 and adapted to be slid relatively thereto, the slider 1B being positioned on the front side of the track rail 2, the slider 1D being positioned on the rear side thereof.

Figure 8:
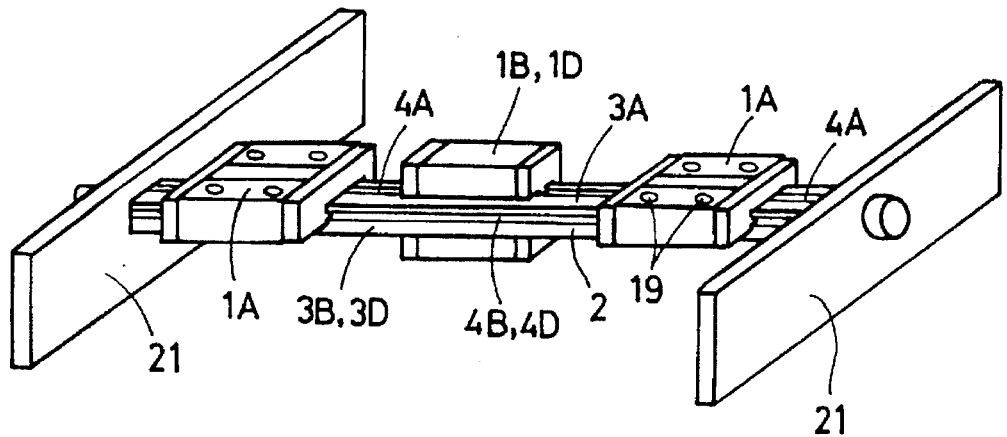
FIG. 8 is a perspective view showing a seventh embodiment of the present invention.

A seventh embodiment of the present invention will now be described with reference to FIG. 8. The seventh embodiment has the same construction as the embodiment except that fixing means are provided at both ends of the track rail 2. Fixing members 21 are secured to both ends of the track rail 2. In the embodiment of FIG. 8, the track rail 2 has two sliders 1A saddled on an upper surface 3A thereof, and a slider 1B or 1D saddled on a side surface 3B or 3D thereof.

Figure 9:
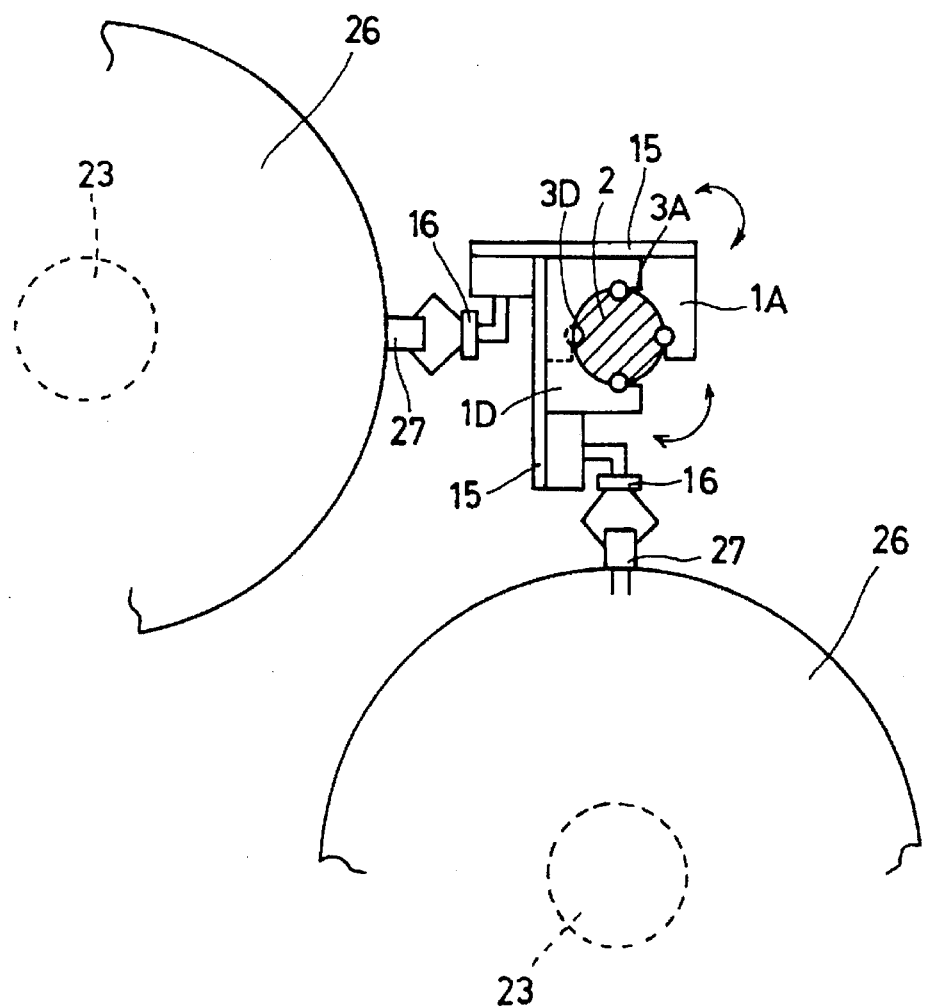
FIG. 9 is an explanatory view showing an eighth embodiment of the present invention.

An eighth embodiment of the present invention will now be described with reference to FIG. 9. The eighth embodiment is formed by providing support members 15 and clamps 16 on the sliders 1 in the fifth embodiment shown in FIG. 6. A track rail 2 in use comprises a cylindrical shaft, such as a ball spline shaft of a substantially circular cross-sectional shape. The track rail 2 is secured to a mount base so as to extend perpendicularly thereto, and adapted to be rotatable around its axis. Owing to a rotational movement of the track rail 2, sliders 1A, 1D saddled on the track rail 2 can be moved, for example, between stockers 23. In the eighth embodiment, sliders 1A, 1D saddled on an upper surface 3A and a side surface 3D respectively of the track rail 2 are shown. Support members 15 and clamps 16 are fixed to the sliders 1A, 1D, and the clamps 16 are shown with portions to be clamped 27 of parts 26, such as CD's held therein.

Figure 10:
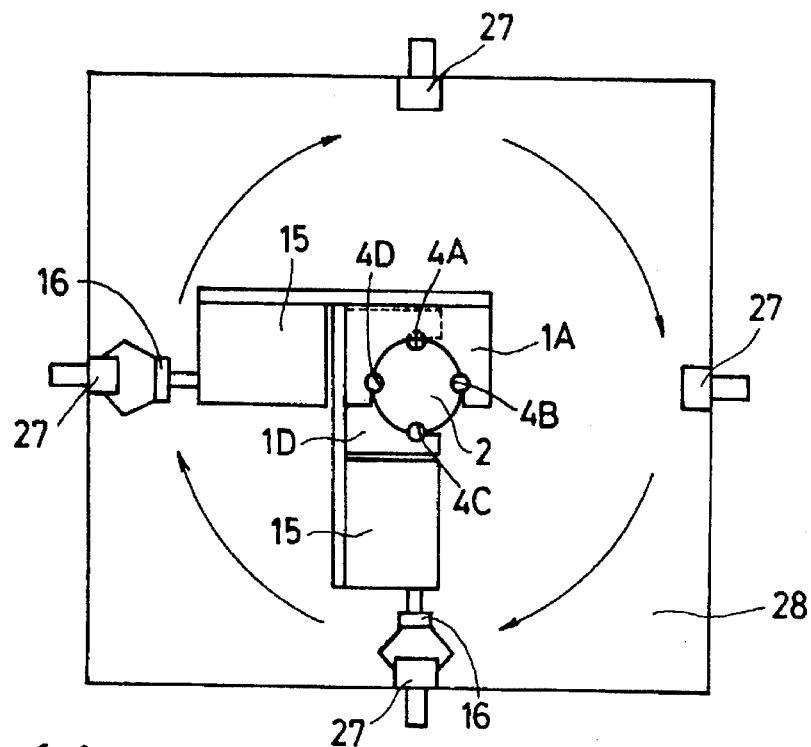
FIG. 10 is a top view showing a ninth embodiment of the present invention.
Figure 11:
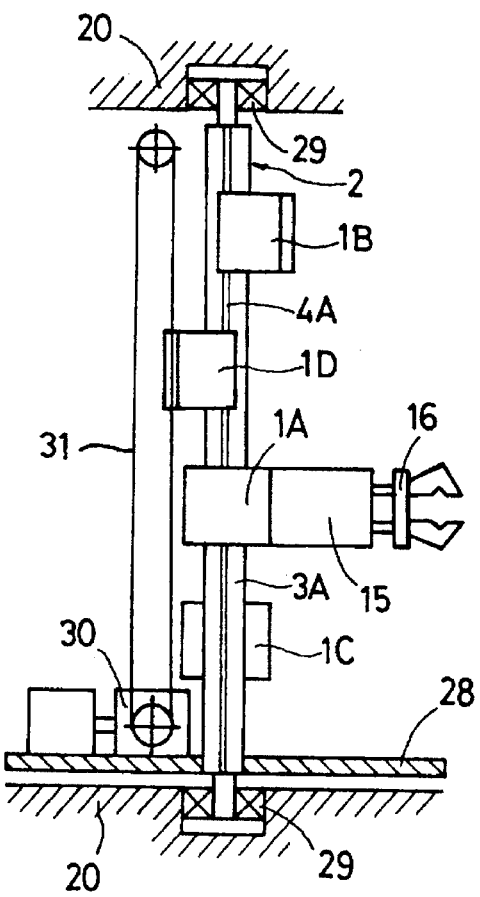
FIG. 11 is a side view showing an apparatus using the compound rolling guide unit of FIG. 10.

A ninth embodiment of the present invention will now be described with reference to FIGS. 10 and 11. In the ninth embodiment, a track rail 2 is fixed upright to a mounting plate 28, and support members 15 and clamps 16, such as chucks are provided on sliders 1. The track rail 2 in use comprises a cylindrical shaft of a substantially circular cross-sectional shape which is fixed rotatably to mount bases 20, which are positioned on the upper and lower sides of the track rail 2, via bearings 29. If the track rail 2 is set so that it is turned, for example, 90° C. at a time, the sliders 1A, 1D can pick up or place parts 27, such as workpieces from or on stations provided in various planes. The sliders 1A, 1D (in FIG. 10, the sliders 1B, 1C are omitted) can be formed so that they are moved in the longitudinal direction of the track rail 2, and can transfer the parts 27 in the vertical direction. The vertical movements of the sliders 1 are made independently of that of another by motors 30 and chains 31. FIG. 11 shows a motor 30 and a chain 31 for the slider 1D, a part of the chain 31 being fixed to the slider 1D. The slider 1D is moved vertically by a driving force of the chain 31.

Figure 12:
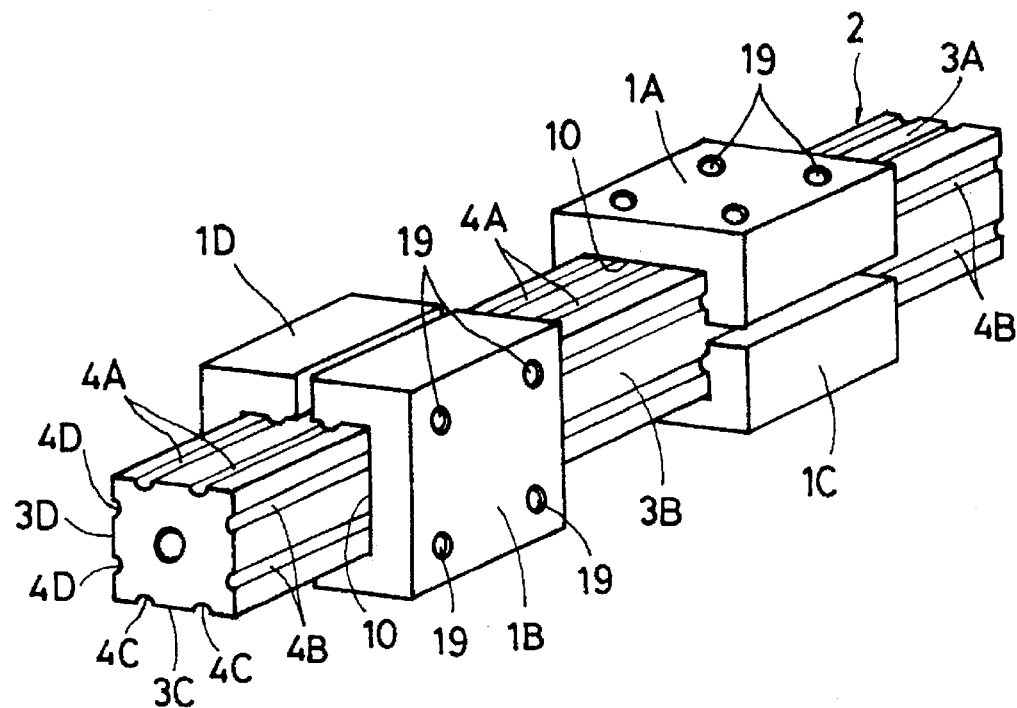
FIG. 12 is a perspective view showing a tenth embodiment of the present invention.

A tenth embodiment of the present invention will now be described with reference to FIG. 12. The tenth embodiment has the same construction as the first embodiment of FIG. 2 except the shape of a track rail 2 is different. The track rail 2 is formed to a substantially quadrangular cross-sectional shape (square or rectangular cross-sectional shape), and has four surfaces 3A, 3B, 3C, 3D, each 3 of which is provided with a plurality (two in the illustrated embodiment) of raceway grooves 4. Namely, two raceway grooves 4A, 4A; 4B, 4B; 4C, 4C; 4D, 4D are formed in an upper surface 3A, a side surface 3B, a lower surface 3C and a side surface 3D respectively of the track rail. In the tenth embodiment, the sliders 1A, 1C can be formed so that the strokes thereof do not interfere with each other when they are slid relatively to each other. Accordingly, these sliders 1A, 1C can be slid independently of each other on the track rail 2. The sliders 1B, 1D can also be slid independently of each other on the track rail 2. The sliders 1A, 1C; 1B, 1D can be fixed together. In this embodiment, the sliders 1A, 1B, 1C, 1D can be formed to the same or different sizes. The raceway grooves 4 in the track rail 2 can also be formed to different sizes.

Figure 13:
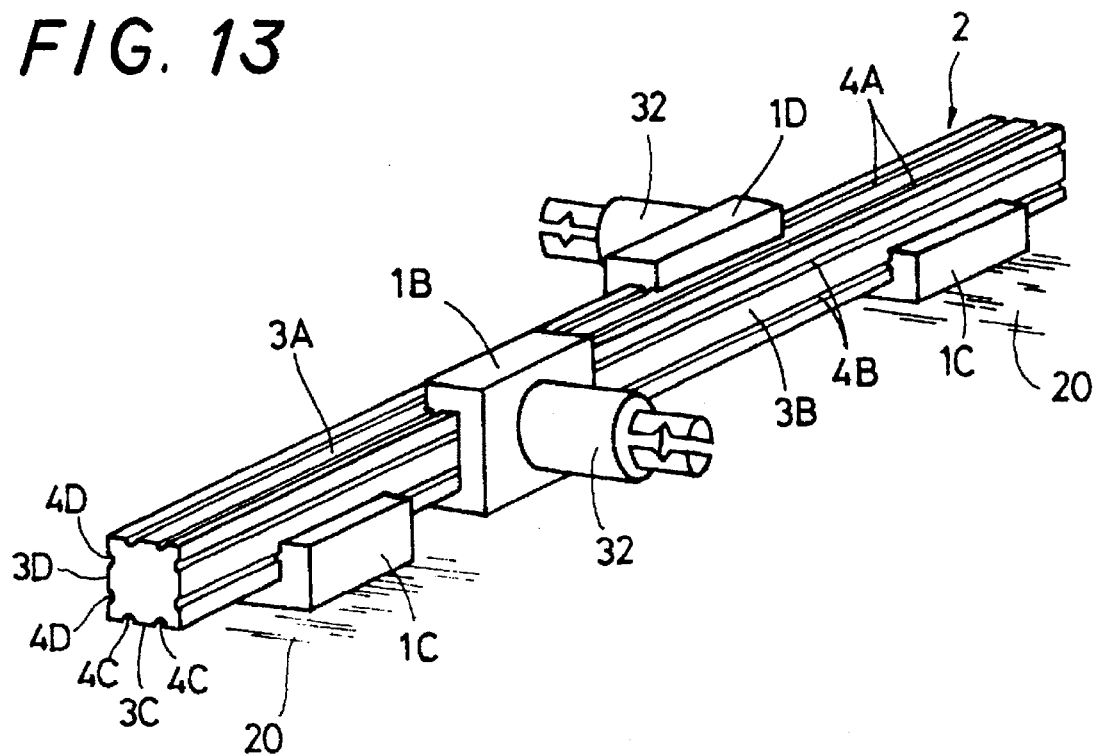
FIG. 13 is a perspective view showing an eleventh embodiment of the present invention.
Figure 14:
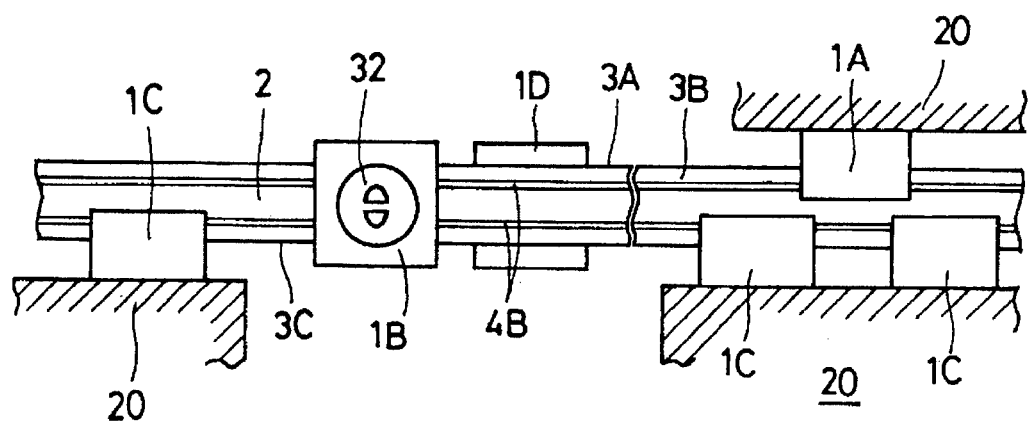
FIG. 14 is a front view showing the compound rolling guide unit of FIG. 13.

An eleventh embodiment of the present invention will now be described with reference to FIGS. 13 and 14. The eleventh embodiment has the same construction as the tenth embodiment of FIG. 12 except that the saddled condition of the sliders 1 moved slidingly on a track rail 2 is different. The sliders 1B, 1D can be slid relatively on the track rail 2 in the longitudinal direction thereof by a driving unit (not shown), and clamps 32, such as chucks are fixed to the sliders 1B, 1D. The sliders 1C, 1A saddled on the track rail 2 are fixed on a mount base 20.

Figure 15:
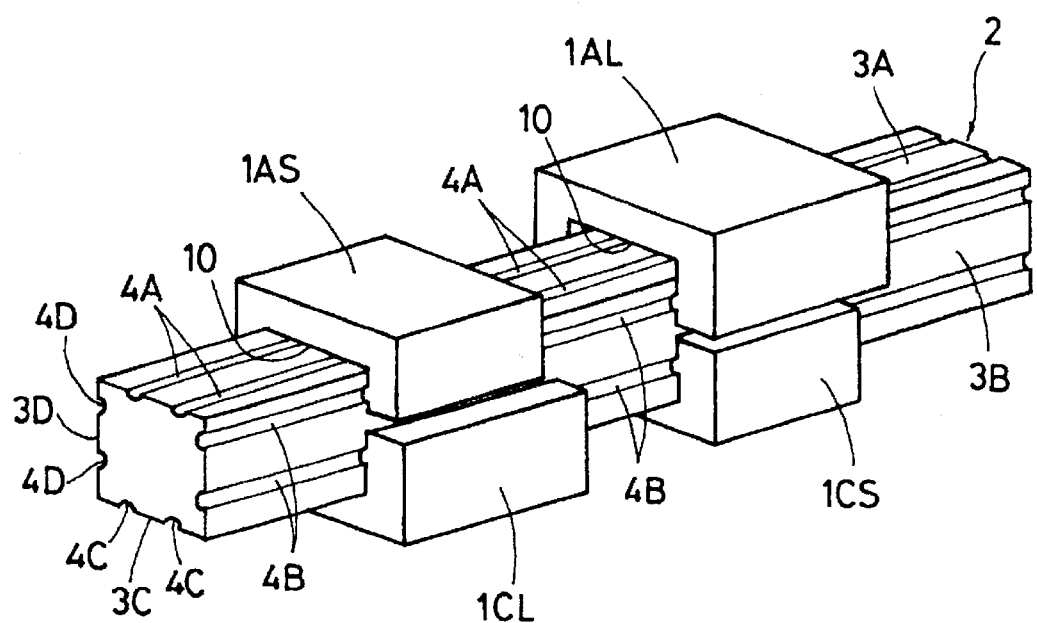
FIG. 15 is a perspective view showing a twelfth embodiment of the present invention.

A twelfth embodiment of the present invention will now be described with reference to FIG. 15. The twelfth embodiment has the same construction as the tenth embodiment of FIG. 12 except that the sizes of the sliders moved slidingly on a track rail 2 are different from one another. The sliders 1AS, 1CS saddled on the track rail 2 have smaller sizes, and the sliders 1AL, 1CL larger sizes.

What is claimed is:

1. A compound rolling guide unit comprising:

a track rail formed to a substantially quadrangular cross-sectional shape having four longitudinal surfaces, said track rail being provided with first raceway grooves which extend along all opposite surfaces of said four longitudinal surfaces, said first raceway grooves formed in the opposite surfaces of said track rail being paired with each other, sliders provided in the portions thereof which are opposed to said first raceway grooves with second raceway grooves, and saddled on and slid relatively to said track rail, said sliders being fitted in different pairs of said first raceway grooves and comprising means for being slid independently of each other and relatively to and in the longitudinal direction of said track rail, mount bases supporting any one of said track rail and said sliders, and said sliders comprising rolling elements rolling in raceways formed between said first and second raceway grooves, casings provided with recesses in which said second raceway grooves are formed, and end caps provided on both end surfaces of said casings.

2. The compound rolling guide unit according to claim 1, wherein said track rail is fixed on said mount bases.

3. The compound rolling guide unit according to claim 1, wherein said track rail is fixed rotatably on said mount bases via bearings.

4. The compound rolling guide unit according to claim 1, wherein at least one of said sliders is fixed on said mount bases.

5. The compound rolling guide unit according to claim 1, wherein said sliders moved slidingly on and relatively to said track rail have different sizes.

6. The compound rolling guide unit according to claim 1, wherein said first raceway grooves formed in each surface of said track rail comprise a single raceway groove.

7. The compound rolling guide unit according to claim 1, wherein said first raceway grooves formed in each surface of said track rail comprise a plurality of raceway grooves.

8. A compound rolling guide unit comprising:

a track rail formed to a substantially circular cross-sectional shape having a longitudinal circular surface, said track rail being provided with four first raceway grooves which extend along said surface at diametrically-different positions of said track rail, said first raceway grooves being paired in the substantially diametrical direction of said track rail, sliders provided in the portions thereof which are opposed to said first raceway grooves with second raceway grooves, and saddled on and slid relatively to said track rail, said sliders being fitted in different pairs of said first raceway grooves and comprising means for being slid independently of each other and relatively to and in the longitudinal direction of said track rail, mount bases supporting any one of said track rail and said sliders, and said sliders comprising rolling elements rolling in raceways formed between said first and second raceway grooves, casings provided with recesses in which said second raceway grooves are formed, and end caps provided on both end surfaces of said casings.

9. The compound rolling guide unit according to claim 8, wherein said track rail is fixed on said mount bases.

10. The compound rolling guide unit according to claim 8, wherein said track rail is fixed rotatably on said mount bases via bearings.

11. The compound rolling guide unit according to claim 8, wherein at least one of said sliders is fixed on said mount bases.

12. The compound rolling guide unit according to claim 8, wherein said sliders moved slidingly on and relatively to said track rail have different sizes.

13. The compound rolling guide unit according to claim 8, wherein the diametrically-different positions at which the four first raceway grooves which extend along the surface are spaced approximately equally from one another along the surface, such that the positions are disposed at approximately 90 degrees from one another about a center line of the track rail.

* * * * *